2,477,674

UNITED STATES PATENT OFFICE 2,477,674

PREPARATION OF 1,4-DICYANO-2-BUTENE

Gerald M. Whitman, Claymont, Del., assignor to E. I. du Pont de Nemours & Company, Wilmington, Del., a corporation of Delaware No Drawing. Application August 12, 1947, Serial No. 768,283

13 Claims. (Cl. 260—465.8)

This invention relates to organic nitriles and more particularly to a process for preparing 1,4-dicyano-2-butene, a recently synthesized compound having the formula $$CN-CH_2-CH=CH-CH_2-CN$$

which may also be referred to by the name $\Delta^\beta$-dihydromucononitrile.

This application is a continuation-in-part of my applications Serial Numbers 696,356, and 696,357, filed September 11, 1946, both now abandoned.

Preparation of 1,4-dicyano-2-butene has been proposed by reacting the corresponding dichloro or dibromo-butene with an alkali or alkaline earth metal cyanide, the metal cyanide being used as the preformed salt or made in situ from the metal hydroxide and hydrocyanic acid. This method is disclosed in U. S. Patent 2,342,101, issued February 22, 1944, and was successful in affording the first synthesis of 1,4-dicyano-2-butene. However, under the conditions described, the yields in 1,4-dicyano-2-butene were low, of the order of about 20%, and there was considerable formation of by-products, such as 1-cyano-1,3-butadiene. My investigations have led me to conclude that the relatively poor results of the prior process have been caused by the fact that, under the conditions described, the reaction medium was always alkaline and that these alkaline conditions were responsible for the low yields and the formation of by-products.

It is an object of this invention to provide a new process for preparing organic nitriles and particularly 1,4-dicyano-2-butene. A further object is to provide a process for preparing 1,4-dicyano-2-butene in high yields. A still further object is to provide a process whereby 1,4-dicyano-2-butene is obtained from readily available starting materials with minimum formation of by-products. Other objects will appear hereinafter.

These objects are accomplished by the following invention which comprises cyanating a 1,4-dihalo-2-butene, wherein the halogen atoms are of atomic weight between 35 and 80, by reacting it with hydrogen cyanide under non-alkaline conditions, that is in a reaction medium, the liquid phase of which is non-alkaline throughout the reaction. In the preferred embodiment of this invention the reaction is carried out in the presence of a cuprous halide which acts as a catalyst.

Either the dichloro or the dibromobutenes may be used. The dichlorobutenes are cheaper and therefore preferred. In the description which follows, the term "dihalobutene" is sometimes used in the interest of brevity. It should be understood that the term refers to either the 1,4-dichloro-2-butene or the 1,4-dibromo-2-butene.

The critical feature of the invention is the use of non-alkaline, i. e., neutral or acidic liquid reaction media. It is only when non-alkaline conditions are maintained throughout the reaction that commercially successful yields of 1,4-dicyano-2-butene can be realized. Non-alkaline conditions in the reaction of hydrogen cyanide with the dihalobutenes can be achieved in various ways, several of which are illustrated below. For example, the dihalobutene may be reacted with hydrogen cyanide in the presence of a reactant which neutralizes the hydrogen halide formed without introducing alkalinity. Among such agents, the most useful are the carbonates of metals of group II of the periodic table, for example, the carbonates of magnesium, calcium, zinc, or barium. Another method of conducting the reaction consists in treating the dihalobutene with hydrogen cyanide in the presence of an alkali cyanide, e. g., sodium cyanide, which neutralizes the hydrogen halide and simultaneously forms more hydrogen cyanide. In this case, however, the reaction medium should be substantially anhydrous, that is, it should preferably contain no more water than the small amount (2–3.5%) usually present in commercial hydrogen cyanide, for the reason that alkali cyanides have an alkaline reaction in aqueous media. Alkali cyanides, however, are substantially insoluble in hydrogen cyanide. Yet a third method of carrying out the reaction consists in reacting the dihalobutene with hydrogen cyanide per se without absorbing agents for the hydrogen halide. This method is not the preferred one since it tends to give lower yields than when a group II metal carbonate or an alkali cyanide is present to absorb the hydrogen halide formed. In all of these methods, the liquid phase of the reaction medium, i. e. hydrogen cyanide with or without added diluent, is non-alkaline (neutral to acidic), provided, however, that when an alkali cyanide is used the medium is substantially anhydrous. In all cases the reaction is greatly facilitated by the use of a cuprous halide catalyst.

In the preferred practice of this invention, there is used at least two moles of hydrogen cyanide per mole of 1,4-dihalo-2-butene, since otherwise the yield in dicyanobutene would be correspondingly reduced. The hydrogen cyanide referred to in the examples is the commercial material which normally contains between 2 and 3.5% of water; or, if desired, there may be used hydrogen cyanide which has been dehydrated and redistilled and which is, for all practical purposes, water-free.

Since the reaction proceeds more smoothly when the mixture is fluid enough to afford maximum contact between liquid and solid reactants, if present, it is desirable to use a liquid diluent. The diluent may be excess hydrogen cyanide, which is a good suspension medium for the solid reactants. Moreover, the presence of excess hydrogen cyanide favors complete reaction of the dihalobutene. Thus the conditions giving optimum yields are those in which an excess of hydrogen cyanide, for example a total of at least 4 moles per mole of dihalobutene, is used. Preferably there is used between about 6 to 10 moles of hydrogen cyanide per mole of dihalobutene, but this ratio may be raised to 12:1 or 15:1 or even more if desired. The excess hydrogen cyanide can, of course, be recovered and recycled.

As has been said, a preferred embodiment of the invention involves the use, as an agent capable of absorbing the hydrogen halide without creating alkalinity, of a carbonate of a metal of group II of the periodic table. For reasons of availability and effectiveness, the preferred carbonates are those of metals having atomic weights below 138. The most useful are the carbonates of calcium, magnesium, and barium, particularly the first named. Preferably there is used at least one mole of carbonate per mole of dihalobutene. Much more can be used if desired, for example up to 3 moles or more, but a large excess of carbonate does not appear to increase the yields.

Another useful embodiment of the invention involves the use, in conjunction with hydrogen cyanide, of an alkali cyanide under substantially anhydrous conditions, that is, in a medium containing no more water than is usually present in commercial hydrogen cyanide. Any alkali metal cyanide can be used, for example potassium or lithium cyanide, but sodium cyanide is preferred. It is believed that the dihalobutene reacts directly with the hydrogen cyanide, the alkali cyanide serving to absorb the resulting hydrogen halide. Regardless of whether or not this theory is correct, it is sufficient to use at least two moles of alkali metal cyanide per mole of dihalobutene, although an excess of alkali cyanide of the order of 10 to 50% is usually desirable. Of course, more can be used if desired.

The reaction is extremely slow at low or ordinary temperature. In order to achieve a practical reaction rate, temperatures below 20° C. should not be used. An optimum temperature range when using hydrogen cyanide alone or with carbonates of group II metals is 100 to 150° C., although higher temperatures, up to the critical temperature of hydrocyanic acid, that is about 183° C., may be used. The higher temperatures are preferable to obtain optimum yields, particularly where a cuprous halide catalyst is not employed in the reaction. When alkali cyanides are used, the temperature should preferably be kept below 100° C. to minimize the tendency of alkali cyanides to hydrolyze or polymerize hydrogen cyanide. In this case the preferred temperature range is between about 40° C. to about 80° C.

Cuprous halides, that is cuprous fluoride, cuprous chloride, cuprous bromide and cuprous iodide are specific catalysts for this reaction, although cuprous fluoride and cuprous chloride are less effective at the lower temperatures. It is therefore desirable to use a temperature of at least 100° C. when these catalysts are used. The minimum amount of cuprous halide to be used is of the order of about 0.001 mole per mole of dihalobutene. Above this limit the amount of cuprous halide is not very critical, and it may be as high as desired, although no advantage appears to be gained by using more than 0.25 to 0.3 mole of cuprous halide per mole of dihalobutene. The amount of cuprous halide required to achieve a practical rate of reaction decreases as the temperature increases. A satisfactory range is between 0.005 and 0.2 mole of cuprous halide catalyst per mole of dihalobutene. With certain materials of construction which tend to decompose hydrocyanic acid, such as stainless steel, the cuprous halide acts also as a stabilizer. In addition to cuprous halide, metallic copper is also a satisfactory catalyst, probably because it is converted to cuprous halide by the hydrogen halide which forms. The reaction will proceed satisfactorily without catalyst, as illustrated in some of the examples, but in such a case, higher reaction temperatures are necessary for a practical reaction rate.

This invention is further illustrated by the following examples, in which parts are by weight, unless otherwise specified.

*Example I*

A mixture of 100 parts (1 mole) of powdered calcium carbonate and 10 parts of cuprous bromide was charged into a silver-lined pressure vessel, which was sealed, evacuated and cooled to 0° C. A mixture of 50 parts (0.4 mole) of 1,4-dichloro-2-butene and 85 parts (3.1 moles) of hydrogen cyanide was sucked into the pressure vessel, which was then placed in a shaking assembly and heated at 105° C. for 14 hours under the autogenous pressure developed by the reactants. At the end of this time, the shaking was stopped, the vessel allowed to cool, the excess pressure bled off and the residual hydrogen cyanide distilled from the vessel. The vessel was then opened and the solid product washed from it with chloroform. The chloroform solution was filtered, the solid extracted with hot benzene, and the combined chloroform and benzene extracts were distilled. After removal of the low-boiling materials 34.2 parts of 1,4-dicyano-2-butene was collected at 97–143° C. (1 mm.), correspondinging to 80.7% of the theoretical yield. The material had a capillary melting point of 73–75° C. and a freezing point of 70.3° C. and was therefore of satisfactory purity for most purposes. Upon redistillation the product boiled steadily at 90–91° C. (.5 mm.). It had a capillary melting point of 74–76° C. and a freezing point of 72.5° C. After recrystallization from benzene it melted at 75–77° C. A sample of the dinitrile hydrolyzed readily in concentrated hydrochloric acid to $\Delta^\beta$-dihydromuconic acid, M. P. 192–195° C.

Substantially identical yields, that is between 77 and 81%, are obtained when the reaction is carried out under the above-described conditions, except that the temperature is increased to 120° C., the reaction time being nine hours, or when the amount of calcium carbonate is decreased to 50 parts, all other conditions being those of Example I.

*Example II*

A mixture of 50 parts of 1,4-dichlorobutene-2, 100 parts of calcium carbonate, 10 parts of cuprous bromide and 85 parts of hydrogen cyanide was charged into a stainless steel pressure vessel. The vessel was sealed, placed in a shaking assembly, and heated at 70° C. for 15 hours under autogenous pressure. At the end of this period the vessel was cooled, the residual pressure released and the excess hydrogen cyanide distilled from the vessel. The remaining product was washed from the vessel with benzene, and the filtered benzene solution evaporated to dryness. Fractional distillation of the residue yielded 4 parts of recovered 1,4-dichloro-2-butene and nine parts of 1,4-dicyano-2-butene, M. P. 76.5–78.5° C. The yield was 23% of the theoretical, based on the dichlorobutene consumed.

Example III

A mixture of 50 parts of calcium carbonate and 10 parts of cuprous bromide was placed in a silver-lined pressure vessel, which was closed and evacuated. A mixture of 50 parts (0.4 mole) of 1,4-dichloro-2-butene, 28 parts (1 mole) of hydrogen cyanide and 100 parts of dioxane was sucked into the vessel, which was then placed on a shaking assembly and heated to 105° C. for 16 hours under the autogenous pressure generated by the reactants. At the end of this time, the vessel was cooled, and the reaction mixture was treated as in Examples I and II. The yield of 1,4-dicyano-2-butene was 15.8 parts, or 37.3% of the theoretical.

Example IV

A mixture of 50 parts of 1,4-dichloro-2-butene, 50 parts of calcium carbonate, 10 parts of cuprous chloride, 78 parts of acetonitrile and 28 parts of hydrogen cyanide was charged into a stainless steel pressure vessel. The vessel was sealed, placed in a shaking assembly, and heated at 120° C. for 15 hours under autogenous pressure. At the end of this period the vessel was cooled and the reaction mixture was treated as in Examples I and II. The yield of 1,4-dicyano-2-butene was 32.4 parts or 76% of the theoretical.

Example V

A mixture of 50 parts of 1,4-dichloro-2-butene, 50 parts of calcium carbonate, 0.5 part of cuprous chloride and 87 parts of hydrogen cyanide was charged into a stainless steel pressure vessel. The vessel was sealed, placed in a shaking assembly, and heated at 150° C. for 15 hours under autogenous pressure. At the end of this period the vessel was cooled and the reaction mixture was treated as in Examples I and II. The yield of 1,4-dicyano-2-butene was 34.5 parts, or 81% of the theoretical.

Example VI

A mixture of 50 parts of 1,4-dichloro-2-butene, 50 parts of calcium carbonate, 10 parts of cuprous iodide, and 87 parts of hydrogen cyanide was charged into a stainless steel pressure vessel. The vessel was sealed, placed in a shaking assembly, and heated at 120° C. for 16 hours under autogenous pressure. At the end of this period the vessel was cooled and the reaction mixture was treated as in Examples I and II. The yield of 1,4-dicyano-2-butene was 26.5 parts, or 62.4% of the theoretical.

Example VII

A mixture of 50 parts of 1,4-dichloro-2-butene, 50 parts of calcium carbonate, and 87 parts of hydrogen cyanide was charged into a silver-lined pressure vessel. The vessel was sealed, placed in a shaking assembly, and heated at 150° C. for 16 hours under autogenous pressure. At the end of this period the vessel was cooled and the reaction mixture was treated as in Examples I and II. The yield of 1,4-dicyano-2-butene was 36.9 parts, or 87% of the theoretical.

Example VIII

A mixture of 50 parts of 1,4-dichloro-2-butene, 100 parts of calcium carbonate and 87 parts of hydrogen cyanide was charged into a silver-lined pressure vessel. The vessel was sealed, placed in a shaking assembly and heated at 105° C. for 16 hours under autogenous pressure. At the end of this period the vessel was cooled and the reaction mixture was treated as in Examples I and II. The yield of 1,4-dicyano-2-butene was 2.9 parts, or 6.9% of the theoretical. There was also formed about 25% of 1-chloro-4-cyano-2-butene.

Example IX

A charge consisting of 50 parts of 1,4-dichloro-2-butene, 50 parts of calcium carbonate, 4.4 parts of water, 0.5 part of powdered copper, and 87.5 parts of anhydrous hydrogen cyanide purified by distillation from phosphorus pentoxide, was placed in a pressure reaction vessel provided with means of agitation and heating. The mixture was heated with vigorous agitation at 150° C. for a period of 5 hours, the autoclave cooled, and excess hydrogen cyanide separated by distillation from the reaction mixture. The solid reaction product was taken up in chloroform, filtered to remove calcium chloride and unreacted calcium carbonate, and the filtrate fractionally distilled in a precision still. There was obtained 1.6 parts of low boiling foreshots, 37.69 parts of 1,4-dicyano-2-butene, and 0.6 part of nondistillable residue. The conversion and yield to 1,4-dicyano-2-butene corresponds to 89% of the theoretical value.

Example X

A mixture of 50 parts by weight of 1,4-dichloro-2-butene, 50 parts of calcium carbonate, 45.5 parts of commercial hydrogen cyanide containing about 3% water, 5 parts of water, and 0.5 part of metallic copper was charged into an autoclave provided with efficient agitation and means for heating. The autoclave and its contents were brought to a temperature of 150° C. and maintained at this temperature for a period of 5 hours under the autogenous pressure of the mixture. After cooling to room temperature, unreacted hydrogen cyanide was distilled and the reaction product extracted with chloroform. Distillation of the chloroform solution yielded, in addition to the solvent, 21.2 parts of foreshot boiling chiefly at 60° C./12 mm. There was obtained 13.3 parts, or 31% yield of 1,4-dicyano-2-butene and 1.5 parts of non-distillable residue. The distilled 1,4-dicyano-2-butene was identical in physical properties with authentic samples, melting point 76–77° C.

When the above experiment was repeated under substantially identical conditions except that the calcium carbonate was replaced, in dual runs, by 42.2 parts of magnesium carbonate and 80 parts of barium carbonate, respectively, the remainder of the reaction mixture consisting of 50 parts of 1,4-dichloro-2-butene (crude), 0.77 part of cuprous chloride, 87 parts of commercial hydrogen cyanide and 5.8 parts of water, the yields of 1,4-dicyano-2-butene were upwards of 80% of the theory based on the dichlorobutene present. The considerably better yields obtained with magnesium or barium carbonate as compared with that obtained with calcium carbonate are apparently due to the fact that, with the relatively small amount of water present in the reaction mixture (water added and water formed) calcium chloride forms a gummy or pasty hydrate whose physical form is such as to retard the rate of reaction. This is not the case with barium chloride or magnesium chloride, which both remain powdery and mobile in the reaction mixture.

Example XI

A mixture of 50 parts (0.4 mole) of 1,4-dichloro-2-butene, 49 parts (1 mole) of anhydrous sodium cyanide and 10 parts of cuprous bromide was charged into a steel pressure vessel, which was closed, cooled and evacuated. Eighty-five parts (3.1 moles) of hydrogen cyanide was sucked into the vessel, which was placed in a shaking assembly and heated at 50° C. for 14 hours. At the end of this period the vessel was cooled, the hydrogen cyanide distilled off, and the product washed from the vessel with benzene and chloroform. The filtered benzene and chloroform extracts were washed with dilute aqueous alkali, and the solvents removed by distillation. The residue solidified upon cooling and consisted of 1,4-dicyano-2-butene (35.6 parts, or 84% of the theoretical yield). The product can be recrystallized from benzene and is then obtained as colorless crystals, M. P. 77.5–78.2° C. Hydrolysis of the dinitrile in concentrated hydrochloric acid yields dihydromuconic acid, M. P. 192–195° C.

Example XII

A mixture of 49 parts of dried, powdered sodium cyanide, 10 parts of cuprous bromide and 100 parts of methanol was charged into a pressure vessel, which was closed, evacuated and cooled. A mixture of 50 parts of 1,4-dichloro-2-butene and 85 parts of hydrogen cyanide was drawn into the vessel, which was then placed in a shaking assembly and heated at 60° C. for 15 hours. At the end of this time the shaking was stopped, the vessel cooled, the hydrogen cyanide removed by distillation and the remaining product washed from the vessel with chloroform. The chloroform-methanol solution was filtered, the solid extracted with hot benzene, and the combined solution distilled. The yield of 1,4-dicyano-2-butene, M. P. 73.5–75.5°, was 69% of the theoretical.

Example XIII

Fifty parts of 1,4-dichloro-2-butene, 0.5 part of powdered copper, and 87.5 parts of hydrogen cyanide were charged in the order named into an autoclave suitable for operation under moderate pressures and equipped with efficient devices for agitation and heating. The vessel and its contents were heated to a temperature of 150° C. and maintained in the neighborhood of this temperature for a period of 5 hours. The mixture was then cooled, unreacted hydrogen cyanide removed by distillation, and the residual product distilled. There was obtained 5.6 parts of unreacted 1,4-dichloro-2-butene, 2.7 parts of higher boiling material, 3.2 parts of 1,4-dicyano-2-butene, melting point 77° C., and 7.9 parts of nondistillable residue. The 1,4-dicyano-2-butene showed no depression of the melting point when mixed with an authentic sample of 1,4-dicyano-2-butene.

Instead of using a large excess of hydrogen cyanide, it is possible to employ only the stoichiometrical amount, or a moderate excess thereover, for example 30 to 100% excess. In such a case it is convenient, to achieve the desired fluidity, to use an organic diluent. Suitable diluents include dioxane, benzene, toluene, diethyl ether, acetonitrile, propionitrile and similar essentially neutral liquids. Alcohols such as methanol, ethanol or 2-methoxyethanol may be used even though they tend to participate in the reaction to give alkoxy compounds as by-products.

One way to achieve non-alkalinity when an alkali cyanide is used is to keep the system substantially anhydrous. In this case the preferred mode of operation is that wherein no extra diluent is used, fluidity being secured through the use of excess hydrogen cyanide. Water does not interfere with the reaction provided no alkalinity is developed. It should be noted that the reaction of hydrogen cyanide with a dihalobutene in the presence of a group II metal carbonate produces one mole of water per mole of dihalobutene consumed. Examples IX and X illustrate the use of added water in such reaction mixtures.

Since hydrogen cyanide boils at 26° C. it is desirable in practice to operate in closed vessels, although when sufficient diluent other than hydrogen cyanide is present, the operation can be conducted at atmospheric pressure with an efficient condensing system. Preferably the mixture is suitably agitated to insure good contact between the reactants. Sufficient time should be allowed for substantially complete reaction of the dihalobutene to obtain optimum results.

The 1,4-dihalobutenes are prepared according to known methods, e. g., by halogenation of 1,3-butadiene and, separation of the 1,4-dihalo-2-butene from the 3,4-dihalo-1-butene formed at the same time.

The resulting 1,4-dicyano-2-butene is isolated by any suitable method, such as direct distillation from the reaction mixture or preliminary extraction with an appropriate solvent, such as benzene, followed by distillation or crystallization or both of these procedures. It may be purified if desired, but for many purposes purification of the crude product is unnecessary.

The compound, 1,4-dicyano-2-butene, is of great interest as an intermediate and starting material for intermediates in many syntheses, for example through conversion to dihydromuconic acid by hydrolysis or to hexamethylenediamine by reduction. The latter compound is one of the principal ingredients of the polyamides generically designated as nylon.

As many apparently widely different embodiments of this invention may be made without departing from the spirit and scope thereof, it is to be understood that this invention is not limited to the specific embodiments thereof except as defined in the appended claims.

I claim:

1. A process for preparing 1,4-dicyano-2-butene which comprises reacting in the liquid phase at a temperature within the range of 40° to 183° C. a 1,4-dihalo-2-butene wherein the halogen atoms are of atomic weight between 35 and 80 with at least two molar equivalents of hydrogen cyanide under acidic conditions throughout the reaction.

2. A process for preparing 1,4-dicyano-2-butene as set forth in claim 1 wherein said process is carried out in the presence of a cuprous halide catalyst in the liquid phase reaction mixture.

3. A process for preparing 1,4-dicyano-2-butene which comprises reacting in the liquid phase at a temperature within the range of 40° to 183° C. a 1,4-dihalo-2-butene wherein the halogen atoms are of atomic weight between 35 and 80 with at least two molar equivalents of hydrogen cyanide and an alkali metal cyanide under substantially anhydrous and acidic conditions throughout the reaction.

4. A process for preparing 1,4-dicyano-2-butene which comprises reacting in the liquid phase at a temperature within the range of 40° to 183° C. a 1,4-dihalo-2-butene wherein the halogen atoms are of atomic weight between 35 and 80 with at least two molar equivalents of hydrogen cyanide and sodium cyanide under substantially anhydrous and acidic conditions throughout the reaction and in the presence of a cuprous halide catalyst.

5. A process for preparing 1,4-dicyano-2-butene which comprises reacting in the liquid phase at a temperature within the range of 40° to 183° C. 1,4-dichloro-2-butene with at least two molar equivalents of hydrogen cyanide and sodium cyanide under substantially anhydrous and acidic conditions throughout the reaction and in the presence of a cuprous halide catalyst.

6. A process for preparing 1,4-dicyano-2-butene which comprises reacting in the liquid phase at a temperature within the range of 40° to 183° C. a 1,4-dihalo-2-butene wherein the halogen atoms are of atomic weight between 35 and 80 with at least two molar equivalents of hydrogen cyanide under acidic conditions throughout the reaction and in the presence of a carbonate of a metal of Group II of the Periodic Table.

7. A process for preparing 1,4-dicyano-2-butene which comprises reacting in the liquid phase at a temperature within the range of 40° to 183° C. a 1,4-dihalo-2-butene wherein the halogen atoms are of atomic weight between 35 and 80 with at least two molar equivalents of hydrogen cyanide under acidic conditions throughout the reaction, in the presence of a carbonate of a metal of Group II of the Periodic Table and in the presence of a cuprous halide catalyst.

8. A process for preparing 1,4-dicyano-2-butene which comprises reacting in the liquid phase at a temperature within the range of 40° to 183° C. 1,4-dichloro-2-butene with at least two molar equivalents of hydrogen cyanide under acidic conditions throughout the reaction and in the presence of calcium carbonate.

9. A process for preparing 1,4-dicyano-2-butene which comprises reacting in the liquid phase at a temperature within the range of 40° to 183° C. 1,4-dichloro-2-butene with at least two molar equivalents of hydrogen cyanide under acidic conditions throughout the reaction, in the presence of calcium carbonate and in the presence of a cuprous halide catalyst.

10. A process for preparing 1,4-dicyano-2-butene which comprises reacting in the liquid phase at a temperature within the range of 40° to 100° C. 1,4-dichloro-2-butene with at least two molar equivalents of hydrogen cyanide and sodium cyanide under substantially anhydrous and acidic conditions throughout the reaction and in the presence of a cuprous bromide catalyst.

11. A process for preparing 1,4-dicyano-2-butene which comprises reacting in the liquid phase at a temperature within the range of 100° to 183° C. 1,4-dichloro-2-butene with at least two molar equivalents of hydrogen cyanide under substantially anhydrous and acidic conditions throughout the reaction, in the presence of calcium carbonate and in the presence of a cuprous bromide catalyst.

12. A process for preparing 1,4-dicyano-2-butene which comprises reacting in the liquid phase at a temperature within the range of 100° to 183° C. 1,4-dichloro-2-butene with at least two molar equivalents of hydrogen cyanide under acidic conditions throughout the reaction, in the presence of calcium carbonate and in the presence of a cuprous chloride catalyst.

13. A process for preparing 1,4-dicyano-2-butene which comprises reacting in the liquid phase at a temperature within the range of 150° to 183° C. 1,4-dichloro-2-butene with at least two molar equivalents of hydrogen cyanide under acidic conditions throughout the reaction and in the presence of calcium carbonate.

GERALD M. WHITMAN.

REFERENCES CITED

The following references are of record in the file of this patent:

UNITED STATES PATENTS

| Number | Name | Date |
| --- | --- | --- |
| 1,672,253 | Giles | June 5, 1928 |
| 1,859,140 | Hass et al. | May 17, 1932 |
| 2,097,155 | Groll et al. | Oct. 26, 1937 |
| 2,102,611 | Carothers et al. | Dec. 21, 1937 |
| 2,211,240 | Macallum | Aug. 13, 1940 |
| 2,276,156 | Carter et al. | Mar. 10, 1942 |
| 2,342,101 | Cass et al. | Feb. 22, 1944 |
| 2,415,261 | Rogers | Feb. 4, 1947 |
| 2,448,755 | Zellner | Sept. 7, 1948 |

FOREIGN PATENTS

| Number | Country | Date |
| --- | --- | --- |
| 708,111 | France | July 20, 1931 |